US008813023B2

(12) United States Patent
Dillenberger et al.

(10) Patent No.: US 8,813,023 B2
(45) Date of Patent: Aug. 19, 2014

(54) VISUALIZATION OF COMPLEX SYSTEMS USING BUILDINGS

(75) Inventors: Donna N Eng Dillenberger, Yorktown Heights, NY (US); Sandra K. Johnson, Cary, NC (US); Sharad Mishra, Portland, OR (US); Joan L. Mitchell, Longmont, CO (US); Benjamin J. Stoor, Bolingbrook, IL (US); David Ward, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 1488 days.

(21) Appl. No.: 12/182,328

(22) Filed: Jul. 30, 2008

(65) Prior Publication Data

US 2010/0031229 A1     Feb. 4, 2010

(51) Int. Cl.
*G06F 9/44* (2006.01)

(52) U.S. Cl.
USPC .......................................... 717/104; 715/757

(58) Field of Classification Search
None
See application file for complete search history.

(56) References Cited

U.S. PATENT DOCUMENTS

| 5,517,663 | A | * | 5/1996 | Kahn | 345/473 |
| 5,555,354 | A | * | 9/1996 | Strasnick et al. | 345/427 |
| 5,581,797 | A | * | 12/1996 | Baker et al. | 715/708 |
| 5,682,469 | A | * | 10/1997 | Linnett et al. | 345/473 |
| 5,896,133 | A | * | 4/1999 | Lynch et al. | 715/784 |
| 7,243,054 | B2 |  | 7/2007 | Rappaport et al. |  |
| 7,346,858 | B1 | * | 3/2008 | Berg et al. | 715/853 |
| 2005/0216515 | A1 |  | 9/2005 | Bray et al. |  |
| 2007/0282670 | A1 | * | 12/2007 | Repasi et al. | 705/10 |
| 2007/0298805 | A1 |  | 12/2007 | Basak et al. |  |
| 2008/0034326 | A1 |  | 2/2008 | Chiu et al. |  |

OTHER PUBLICATIONS

Till Schümmer, "Lost and Found in Software Space", 2001, 34th Hawaii International Conference on System Sciences.*
Marti et al. "WeatherTank: A Tangible Interface using Weather Metaphors", 2001, MIT Tech Report.*
Wettel et al. "Program Comprehension through Software Habitability", Jun. 2007, 15th IEEE International Conference on Program Comprehension.*
Panas et al. "Communicating Software Architecture using a Unified Single-View Visualization", Jul. 11-14, 2007, 12th IEEE International Conference on Engineering Complex Computer Systems.*
Alam et al. "EvoSpaces Visualization Tool: Exploring Software Architecture in 3D", Oct. 28-31 2007, 14th Working Conference on Reverse Engineering.*
Raphael Marmier "Test-driving EvoSpaces: software visualisation in the real world", 2007, Thesis, Haute ecole de gestion de Geneve, pp. 1-5.*
Dieberger "A City Metaphor to Support Navigation in Complex Information Spaces", 1997, Lecture Notes in Computer Science vol. 1329, pp. 53-67.*

(Continued)

*Primary Examiner* — Jue Louie
(74) *Attorney, Agent, or Firm* — William E. Schiesser; Keohane & D'Alessandro, PLLC

(57) ABSTRACT

The present invention relates to the visualization of a complex system such as a software offering using a set of buildings. A method for generating a visualization of a complex system using a set of buildings in accordance with an embodiment of the present invention includes: representing each of a plurality of complex systems using a respective set of buildings in a virtual city environment. The set of buildings in the virtual city environment is displayed.

18 Claims, 8 Drawing Sheets

(56) References Cited

OTHER PUBLICATIONS

Santos et al. "Experiments in Information Visualization Using 3D Metaphoric Worlds", 2000, Proceedings of the 9th IEEE International Workshops on Enabling Technologies: Infrastructure for Collaborative Enterprises.*

Panas, Berrigan, et al. "A 3D Metaphor for Software Production Visualization", 2003, Proceedings of the Seventh International Conference on Information Visualization.*

Belzer et al. "Software Landscape Visualizing the Structure of Large Software Systems", 2004, Proceedings of the Sixth Joint Eurographics—IEEE TCVG conference on Visualization.*

Doppke et al. "Software Process Modeling and Execution within Virtual Environments", 1998, ACM Transactions on Software Engineering and Methodology, vol. 7, No. 1, pp. 1-40.*

Voinea et al. "CVSscan: Visualization of Code Evolution", 2005, Proceedings of the 2005 ACM symposium on Software visualization, pp. 47-56.*

* cited by examiner

US 8,813,023 B2

VISUALIZATION OF COMPLEX SYSTEMS USING BUILDINGS

FIELD OF THE INVENTION

The present invention relates to data visualization, and more specifically to the visualization of complex systems such as software offerings using a set of buildings.

BACKGROUND OF THE INVENTION

Many complex systems consist of a number of phases, including, for example, initial concept, design and development, testing, support, quality, etc. Each of these phases contains a plethora of information about the specific entity that is present in numerous disparate knowledge repositories. As such, it is often difficult to find and understand specific or related information about a complex system, as well as the interactions and intra-actions between various phases of the complex system. In many instances, the amount of information available is vast, and finding and understanding the relevant information needed by the user may be prohibitively complex, particularly when using the traditional two-dimensional rendering of search results.

SUMMARY OF THE INVENTION

A first aspect of the present invention is directed to a method for generating a visualization of a complex system using a set of buildings comprising: representing each of a plurality of complex systems using a respective set of buildings in a virtual city environment; and displaying the set of buildings in the virtual city environment.

A second aspect of the present invention is directed to a computer system for generating a visualization of a complex system using a set of buildings comprising: at least one processing unit; memory operably associated with the at least one processing unit; and a visualization tool storable in memory and executable by the at least one processing unit, the visualization tool comprising: an offering component configured to represent each of a plurality of complex systems using a respective set of buildings in a virtual city environment; and a display component configured to display the set of buildings in the virtual city environment.

A third aspect of the invention is directed to a computer-readable medium storing computer instructions which, when executed, generates a visualization of a complex system using a set of buildings, the computer instructions comprising: representing each of a plurality of complex systems using a respective set of buildings in a virtual city environment; and displaying the set of buildings in the virtual city environment.

A fourth aspect of the invention is directed to a method for deploying an application for generating a visualization of a complex system using a set of buildings comprising: providing a computer infrastructure being operable to: represent each of a plurality of complex systems using a respective set of buildings in a virtual city environment; and display the set of buildings in the virtual city environment.

A fifth aspect of the present invention provides a computer-implemented method for generating a visualization of a complex system using a set of buildings comprising: representing each of a plurality of complex systems using a respective set of buildings in a virtual city environment; and displaying the set of buildings in the virtual city environment.

A sixth aspect of the present invention provides a data processing system for generating a visualization of a complex system using a set of buildings, comprising: a memory medium comprising instructions; a bus coupled to the memory medium; and a processor coupled to the bus that when executing the instructions causes the data processing system to: represent each of a plurality of complex systems using a respective set of buildings in a virtual city environment; and display the set of buildings in the virtual city environment

Figure 1:
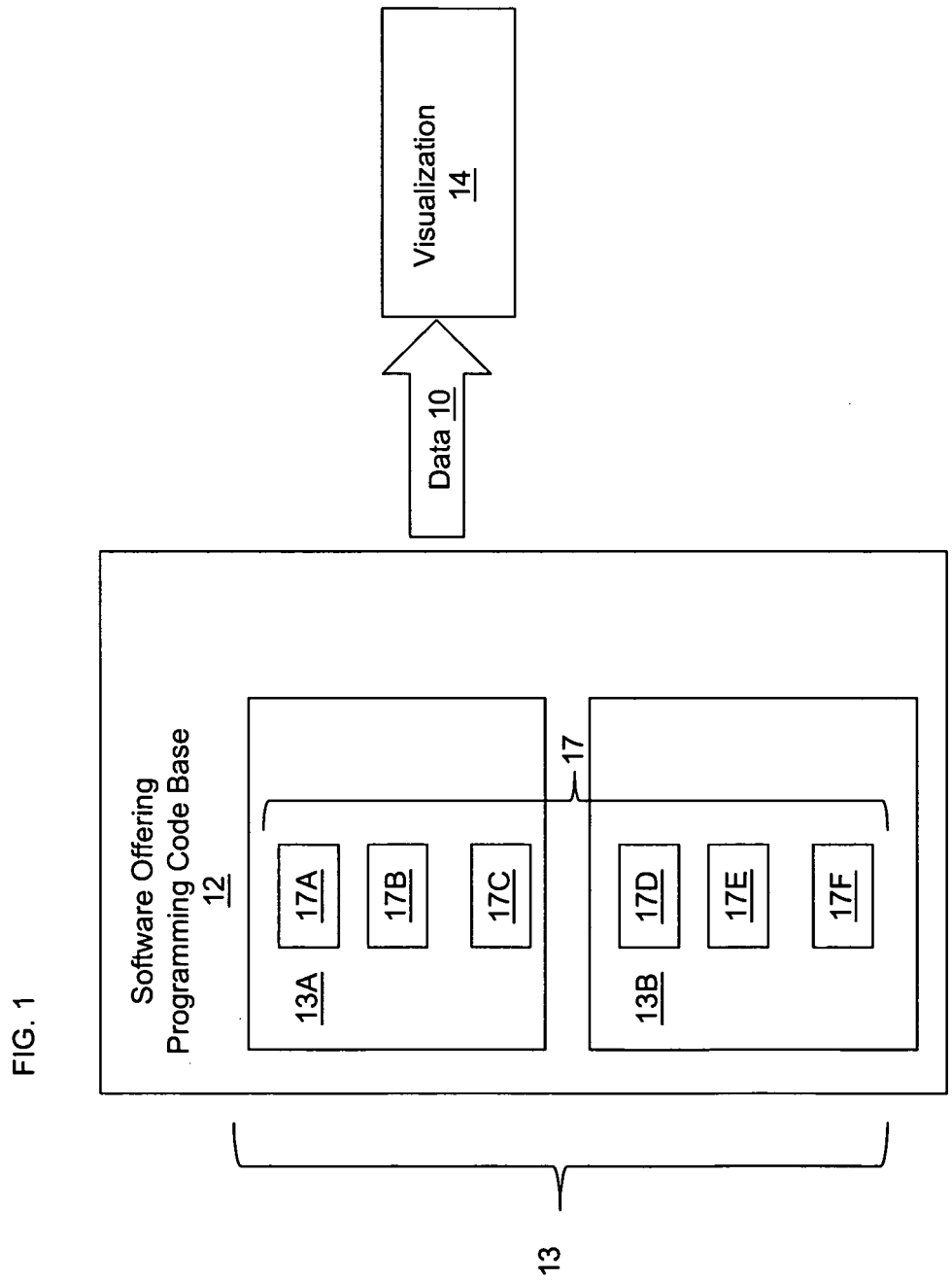
FIG. 1 depicts a visualization of a software offering programming code base in accordance with an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to visualizing a complex system using a set of buildings in a virtual city environment. In these embodiments, a visualization tool provides the capability to provide a visualization of the information of a complex system (i.e., an offering, product, service or solution) in the form of cities, or a set of buildings (i.e., one or more buildings) in a virtual world or video. This includes visualization of buildings, floors, rooms within the buildings, the landscape around the buildings, routes between buildings, means of transport between floors in the buildings, the weather surrounding the buildings, and other visual characteristics as will be described below.

The present invention takes information about a complex system and provides a visual representation of the complex system or a portion of the complex system. For purposes of illustration, the complex system of the present invention will be described hereinafter as a software offering. However, it can be appreciated that the complex system can include virtually any type of data or process that may be represented visually within a virtual city environment. Further, the present invention is not limited to offerings available on a market. In fact, any type of entity that has multiple phases, customer (or some other type of) satisfaction, etc., can leverage embodiments of the system and method of the present invention. This includes, for example, electronic data and/or records, which are used by historians, lawyers, detectives, government officials, etc.

As depicted in FIG. 1, the present invention can be configured to take data 10 from a large software code base, such as software offering programming code base 12, and provide a visualization, such as visualization 14 of a number of software offerings 13A-13B (hereinafter collectively referred to as software offerings 13) in the form of buildings, cities, or portions of cities. Software offerings 13 include a number of components 17A-17F (hereinafter collectively referred to as components 17). Visualization 14 can be two-dimensional, as shown, or three-dimensional. The buildings used in the visualization can comprise real or imaginary structures including, but not limited to: houses, office buildings, hospitals, apartment buildings, stores or other similar structures. These examples of information found in software offering programming code base 12 are only illustrative of some things that may be found and are not exhaustive. Furthermore, the number of software offerings 13 and components 17 shown in FIG. 1 is only for illustration purposes and it can be appreciated that any number of software offerings 13 and components 17 can be used in the practice of the present invention.

Figure 2:
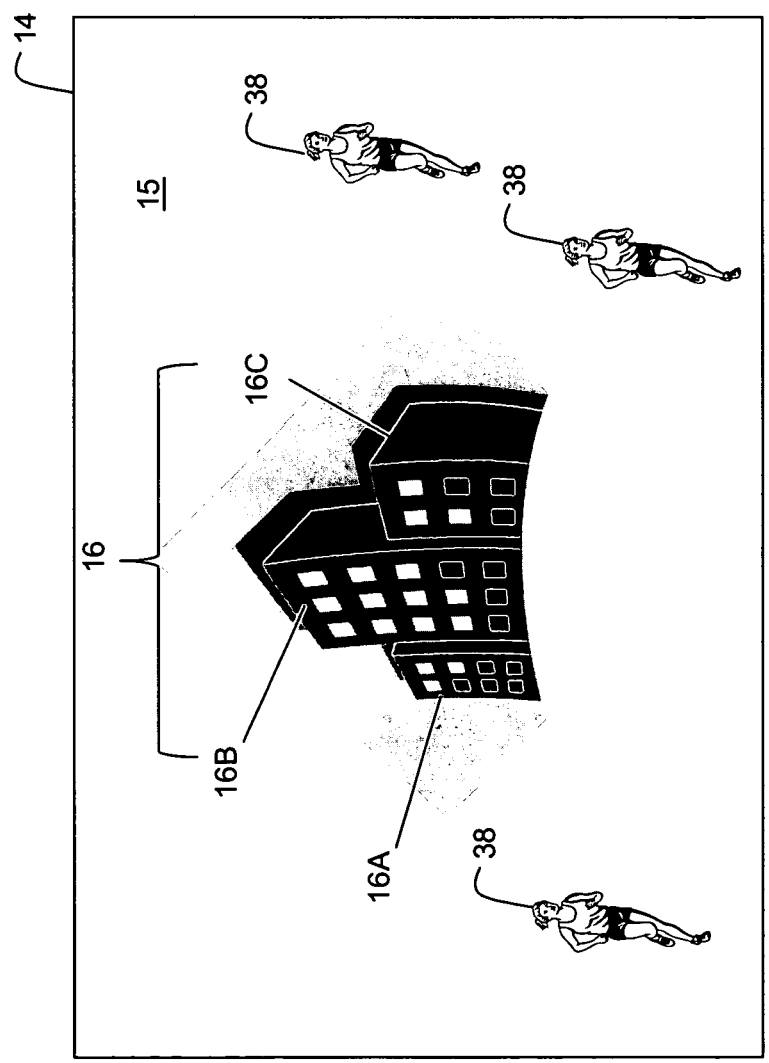
FIG. 2 depicts an illustrative example of a visualization of software offerings in accordance with an embodiment of the present invention.

An illustrative example of visualization 14 of one of software offerings 13 in a virtual city environment 15 in accordance with an embodiment of the present invention is depicted in FIG. 2. In this example, virtual city environment 15 is shown as having a set of buildings 16A, 16B, 16C (collectively referred to hereinafter as buildings 16), each building corresponding to a software offering. Each software offering can correspond to a group of buildings, a single building, or a specific portion of virtual city environment 15. Like the real-world, each virtual city environment 15 comprises a living landscape having virtual content, such as buildings, stores, clubs, sporting arenas, parks, beaches, cities and towns all created by residents of the universe that are represented by avatars 38. A single virtual city environment 15 is shown in FIG. 2 for illustration purposes; however, many more environments may be found in a typical virtual universe, or, alternatively, one environment in a small virtual universe. Furthermore, although only three buildings 16A-16C are depicted in FIG. 2, any number of buildings 16 can be used in the practice of the invention.

Figure 3:
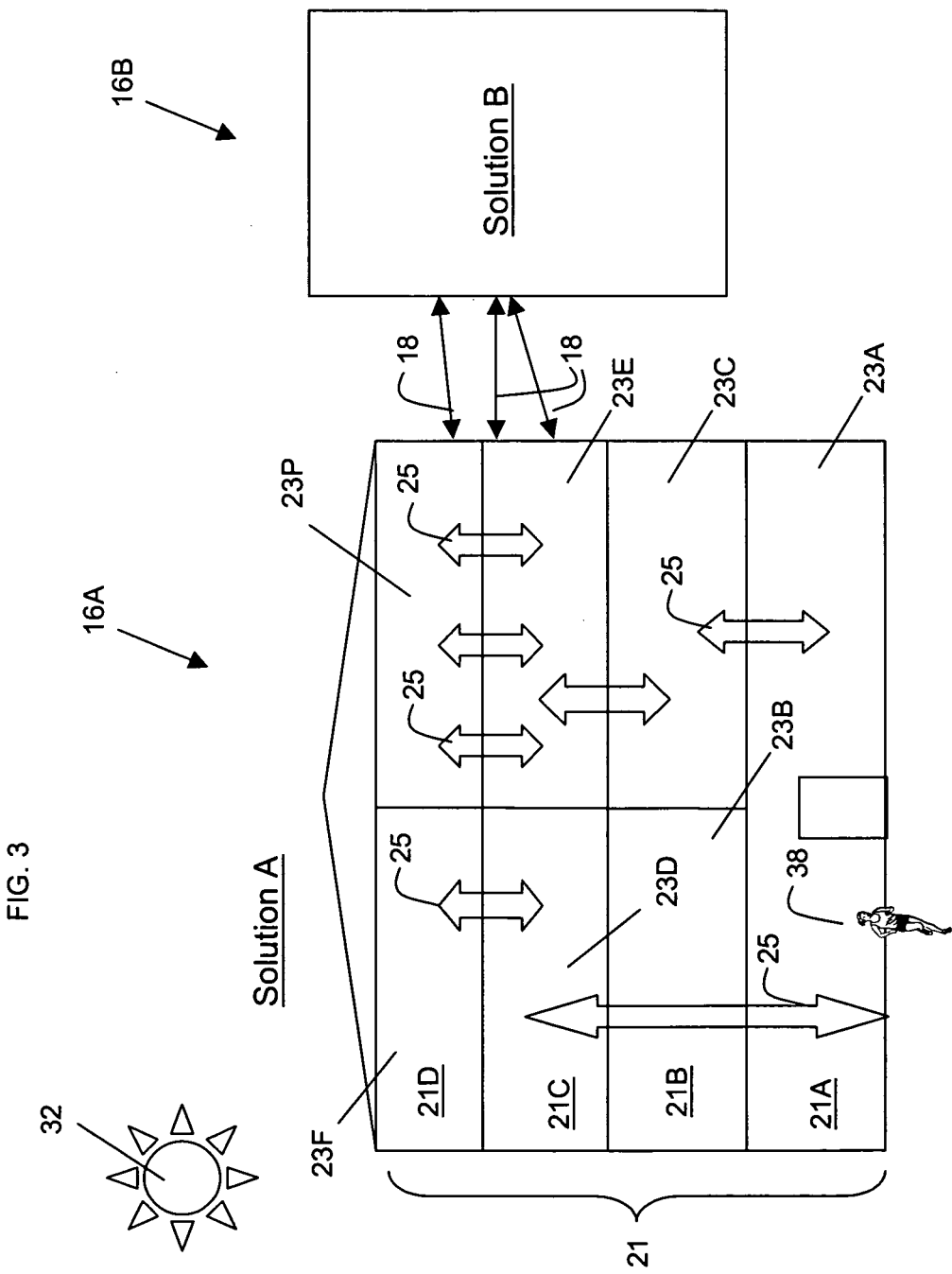
FIG. 3 shows a more detailed view of the software offerings of FIG. 2.

FIG. 3 shows a more detailed view of one possible software offering, such as software offering 13A as discussed in relation to FIG. 2, using buildings 16A, 16B according to the present invention. In this example, the number of floors and the overall size of building 16A are proportional to the number of components 17 of the software offering corresponding to building 16A. As shown, building 16A includes a plurality of floors 21 and a plurality of rooms 23A, 23B, 23C, 23D, 23D, 23E, 23P, each of the floors 21A, 21B, 21C, 21D representing a component of the software offering. In this example, the software offering has four components corresponding to four floors 21A-21D. However, in another embodiment, a group of floors can represent a single component, wherein each floor is a different version of the software offering, or different rooms on the same floor can represent different versions of the component. Although not shown for the sake of clarity, building 16B may also include a plurality of floors and rooms, similar to that of building 16A.

As shown in FIG. 3, each of the plurality of floors 21 is joined by interconnections 25. The interconnections may take on a variety of forms, including, but not limited to: portals, elevators, stairs, escalators, fireman's poles, and other similar interconnections. Each interconnection 25 represents a communication between the components of the software offering. The type and number of interconnections 25 may depict the relative ease of communication between each component. For example, based on the number of interconnections 25, as well as the type of interconnections 25, components 21C and 21D depicted in FIG. 3 are more highly connected than components 21A and 21B. Although not explicitly shown, it can be appreciated that any number of different interconnections 25 may exist between each of the plurality of floors 21.

Furthermore, as also shown in FIG. 3, buildings 16 are connected by a set of interconnections 18 between the buildings. Interconnections 18 may take on a variety of virtual forms including, but not limited to: paths, streets, railroads, subways, catwalks, bridges, tightropes etc. Interconnections 18 reflect the level of interconnectivity between software offerings 13 of interconnected buildings 16. This visualization also brings together disparate sources of data including, but not limited to: problem reporting sources, design databases, test case repositories, original anecdote repositories from developers, architects, testers and people who have worked on the code components through time, etc., and links these sources to the pertinent building. The type of path, or the traffic between buildings represents the dataflow in and out of the software offering. Each different type of interconnection 18 may have a specific meaning, or could be used to represent interactions between solutions. In one embodiment, a higher number of interconnections 18 between the buildings 16 represents a higher connectivity between corresponding software offerings 13.

Another visualization feature of the present invention is the use of weather characteristics surrounding each of buildings 16. The type of weather surrounding a building, such as building 16A (or a group or subset of buildings) is used to specify the level of customer satisfaction with the software offering represented visually by the building. Weather characteristics surrounding building 16A may be dynamically adjusted based on a satisfaction level for software offering 13. For example, as shown in FIG. 3, the presence of a sun 32 represents a high customer satisfaction. In another embodiment, a hazy or overcast sky may represent medium customer satisfaction. The presence of lightning and/or thunderstorms in another embodiment could represent low customer satisfaction. Audio may also be added to enhance the visual weather characteristics. For example, a bright and sunny day may be accompanied by the sound of birds chirping, calming waves, or some other pleasant sound, whereas thunderstorms may be accompanied by the actual sounds of these storms.

Figure 4:
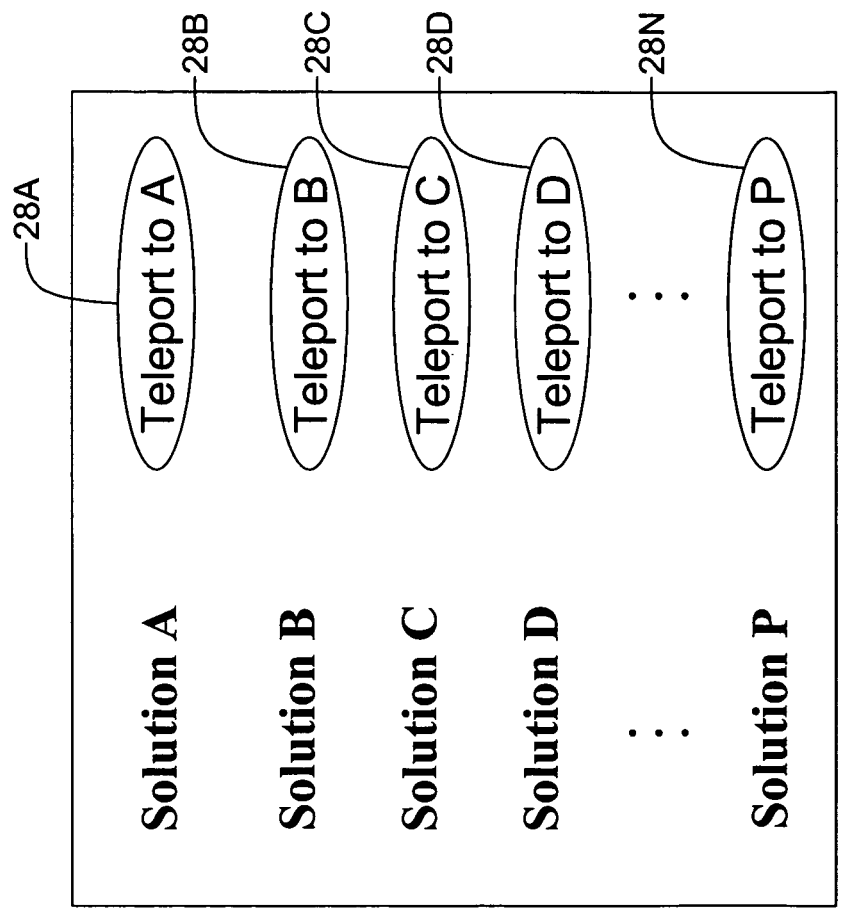
FIG. 4 shows an is an illustration of a potential result from a front-end search according to an embodiment of the present invention.
Figure 5:
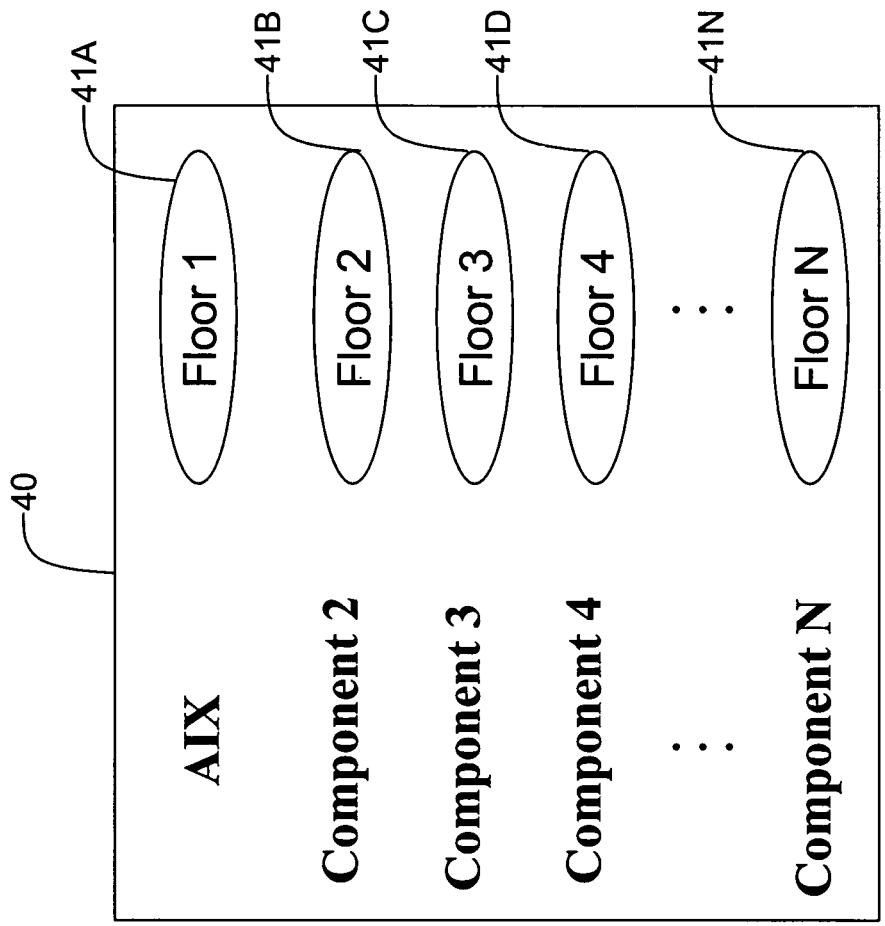
FIG. 5 depicts an illustrative example of a panel used for selecting a component of a software offering according to the present invention.
Figure 6:
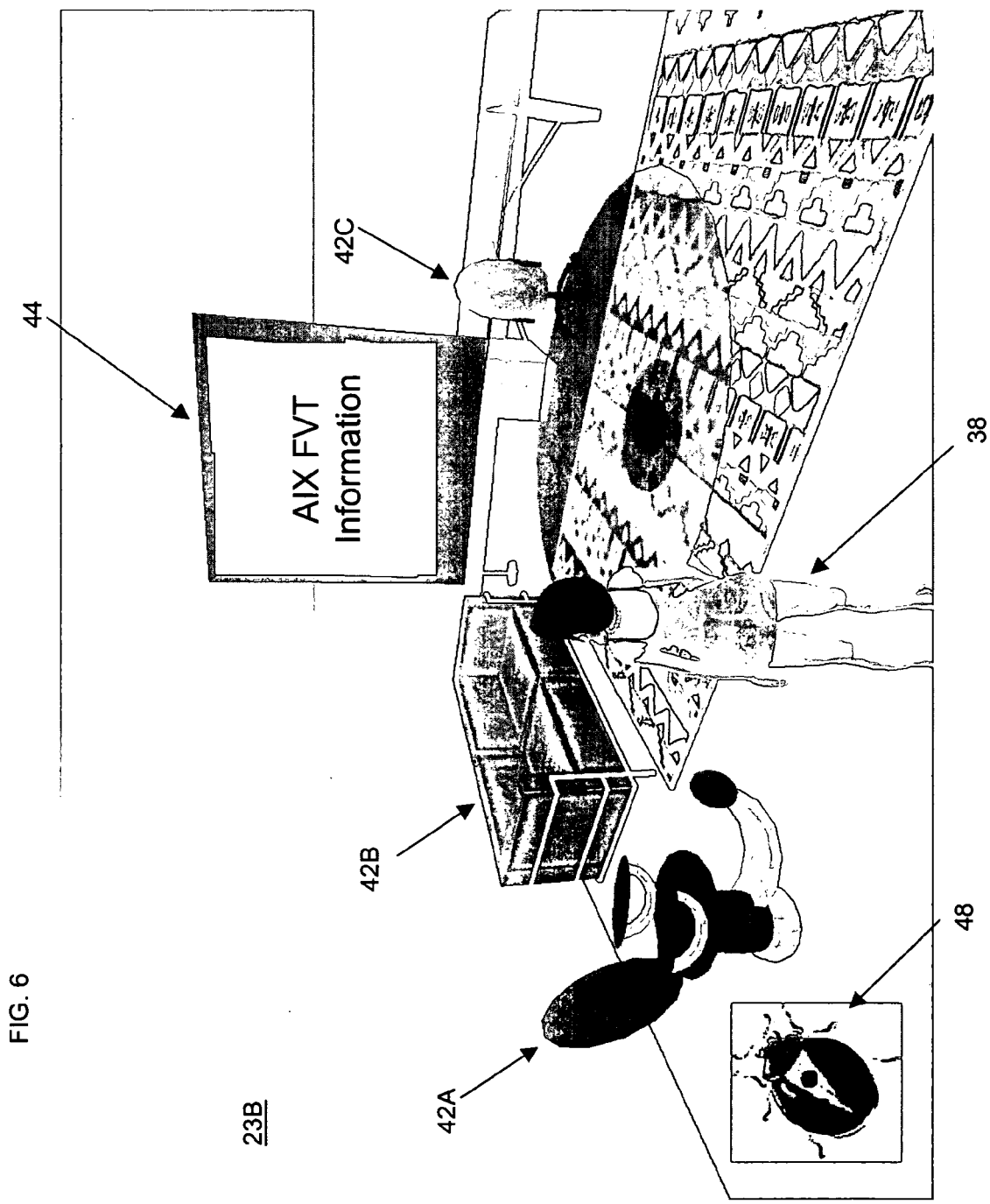
FIG. 6 depicts an illustrative example of a room within a building, which corresponds to a stage of a software offering according to the present invention.

Referring now to FIGS. 4-6, another illustrative example of the visualization of a software offering according to the present invention will be described in more detail. In this example, consider a user that is interested in learning more about Advanced Interactive eXecutive (AIX®), which is contained in Solution A in this example. ("AIX" is registered trademark of International Business Machines Corporation.) The user would then go to a web site that is a front end for searching information in a virtual world and type in "Solution A" as keywords. FIG. 4 is an illustration of a potential result from this search. FIG. 4 includes options 28A-28N for teleporting to a specific site (e.g., a building) in the virtual world that contains more information about Solution A. The user may then click on the "Teleport to A" button of option 28A.

Avatar 38 will then be teleported to the front of a building corresponding to Solution A, such as Building 16A as shown and discussed in the context of FIG. 3. The outward appearance of the building may provide information to the user as well. For example, the look and feel of the building may reflect the stability of the software offering. A strong, firm building on a strong foundation represents a strong software solution, whereas a dilapidated, run-down building represents a weak software solution.

Once avatar 38 teleports to the front of the Solution A building, a script is used (e.g., Linden scripts in Second Life®) to access a customer satisfaction repository 119 (shown in FIG. 7) for Solution A. ("Second Life" is a registered trademark of Linden Research, Inc.) For example, XML-RPC calls can be used in scripts to access information in customer satisfaction repository 119 located in a local storage system, such as storage system 118 shown in FIG. 7, or in a relevant external repository. (XML-RPC is a remote procedure call protocol that uses XML to encode its calls and HTTP as a transport mechanism. The Extensible Markup Language (XML) is a general-purpose specification for creating custom markup languages.) As a result, when avatar 38 reaches the front of a building, the weather around the building is rendered according to the customer satisfaction information. In another embodiment, Solution A's customer satisfaction information can be saved with avatar information, so the customer satisfaction search is only done during certain user specified intervals, or during a default interval (e.g., every 10 times avatar 38 enters the building). Therefore each time avatar 38 reaches the building, the surrounding weather is rendered based upon the saved or recently obtained Solution A customer satisfaction level.

Once avatar 38 enters a building corresponding to the Solution A, the avatar may be presented with a lobby (not shown). The lobby of the building may contain an elevator with a panel, such as panel 40, to select a floor to visit, as shown in FIG. 5. Panel 40 corresponds to a method of searching for information about a specific product or other offering component. Selecting one of the floors 41A-41N will result in avatar 38 teleporting to that floor or to another building if the offering component is in fact another solution.

As shown in FIG. 6, avatar 38 may enter a room to obtain further information about AIX solutions. For example, when avatar 38 reaches a room, such as room 23B, or shortly thereafter, the Linden scripts are used to access customer satisfaction repository 119 to render characteristics (e.g., a décor) of room 23B. The décor within room 23B can be adjusted based on the satisfaction level for respective component of the corresponding software offering. For example, the color of the walls or the lighting within the room can be adjusted to indicate a customer satisfaction level. Or, in another embodiment, the décor of the room can represent the stability of the software offering. For example, newly painted walls may represent a strong software offering, whereas old, peeling paint may represent an outdated or weak solution. Furthermore, the presence or lack of windows may represent whether or not the solution or product is self-contained, or whether it communicates with the outside world.

As also shown in FIG. 6, room 23B contains a plurality of furniture items 42A-42C. During operation, avatar 38 can click on one of plurality of furniture items 42A-42C to get specific information. Each of furniture items 42A-42C represents a stage of the software offering. For example, each of plurality of furniture items 42A-42C may represent different stages of a process (e.g., testing or development) and may optionally be labeled as such. Avatar 38 can then learn more about the "test" or "development" information of the product (or other stage of the solution) by walking to the specific piece of furniture and touching it. In one embodiment, avatar 38 clicks on a couch 42B and a screen, such as information screen 441 which in this case is dedicated to AIX function verification testing (FVT) information, is generated and rendered to avatar 38. Avatar 38 can choose from a number of options related to FVT, including searching for test scripts, code coverage, or test script owner information. If avatar 38 chooses one of these options, the search results are initiated (e.g., using XML-RPC in Linden scripts) to a relevant repository, and the results are rendered on information screen 44. In another embodiment, avatar 38 can choose to do a traditional search, which will result in the instantiation of a web page to initiate a search.

The appearance of each furniture item 42A-42C provides further information about each stage of a software offering. For example, broken furniture in room 23B may represent "defects" in the stage of the software offering. A large, stable couch, for example, may represent a robust, strong solution stage, whereas a small, flimsy rocking chair may represent a weak solution stage.

Furthermore, the presence of virtual insects in a building and/or room may indicate "bugs" (i.e., defects or errors) in the software offering. For example, as shown in FIG. 6, a bug, such as ladybug 48, is found within room 23B. Ladybug 48 may represent a defect with the component(s) corresponding to the floor in which ladybug 48 is located. The presence of ladybug 48 is only for "illustrative purposes", and does not necessarily imply that there are known bugs within AIX. In another embodiment, the type of virtual insect, or the number of virtual insects associated with a particular building or floor, etc. may be indicative of the type of error. For example, a single ladybug found within a room may represent a relatively minor defect, while an infestation of cockroaches on multiple floors of a particular building may represent a serious defect with the corresponding software offering.

Figure 7:
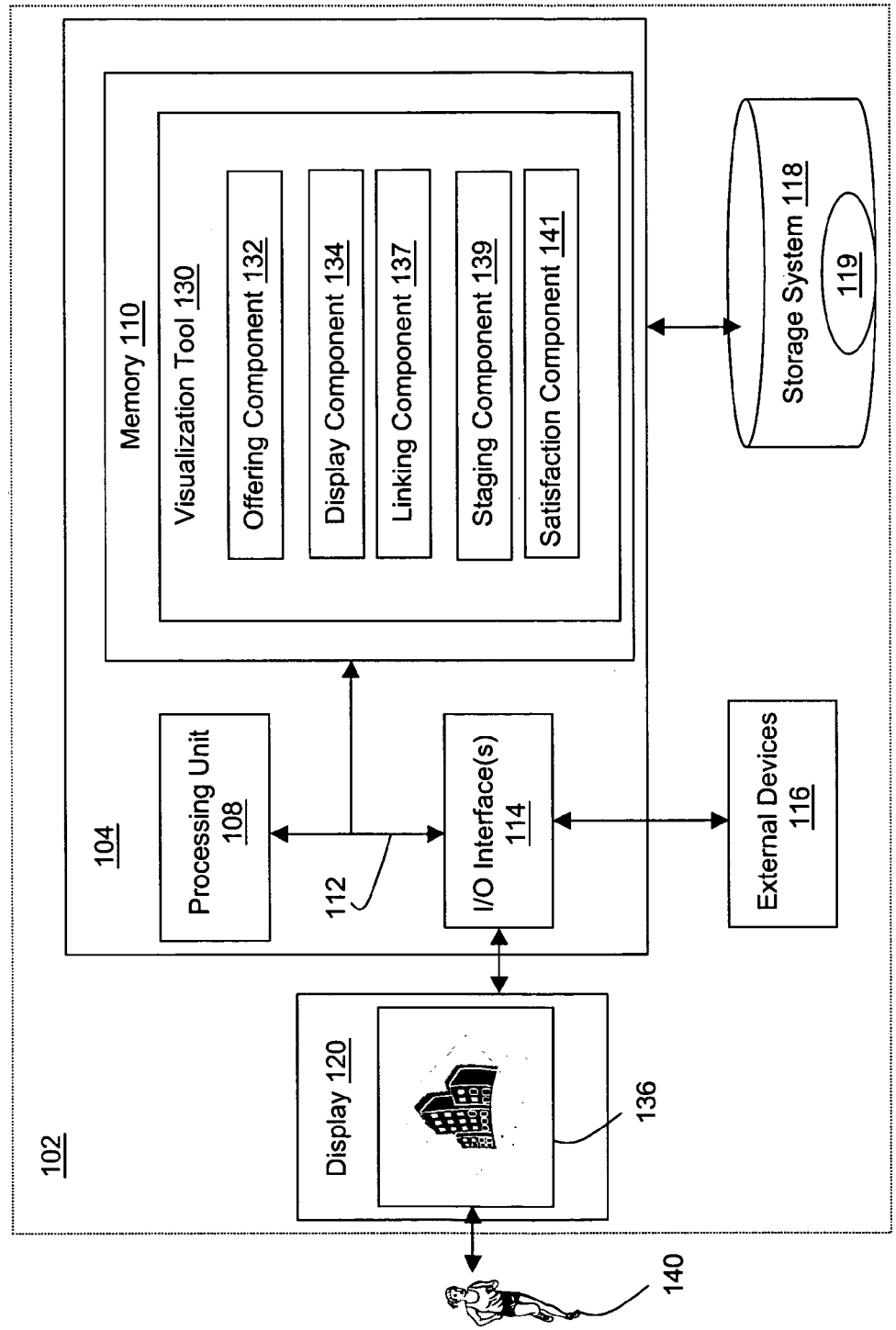
FIG. 7 depicts an illustrative computer system for implementing embodiment(s) of the present invention.

FIG. 7 depicts an illustrative system 100 for the visualization of a software offering using a set of buildings, in accordance with an embodiment of the present invention. System 100 includes an infrastructure, such as computer infrastructure 102, which can perform the various processes described herein. Computer infrastructure 102 is shown including a system, such as computer system 104. Computer system 104 includes a visualization tool 130 having offering component 132 configured to represent each of the plurality of software offerings using a respective set of buildings in a virtual city environment according to embodiments of the invention, as described herein. Visualization tool 130 further includes display component 134 configured to display visualization 136 to user 140. Linking component 137 is configured to interconnect floors and buildings, while staging component 139 is configured to provide a plurality of furniture items corresponding to stages of a software offering according to embodiments of the invention, as described herein.

Visualization tool 130 further comprises satisfaction component 141 configured to adjust the visual and audio characteristics of rooms within buildings, as well as characteristics of the weather surrounding each building based upon, e.g., the corresponding level of customer satisfaction of an offering or component. Satisfaction component 141 may operate with customer satisfaction repository 119 stored in storage system 118, or a repository stored at a remote location.

Computer system 104 is shown as including processing unit 108, memory 110, at least one input/output (I/O) interface 114, and bus 112. Further, computer system 104 is shown in communication with at least one external device 116 and storage system 118. In general, processing unit 108 executes computer program code, such as visualization tool 130, that is stored in memory 110 and/or storage system 118. While executing computer program code, processing unit 108 can read and/or write data from/to memory 110, storage system 118, and/or I/O interface(s) 114. Bus 112 provides a communication link between each of the components in computer system 104. External device(s) 116 can comprise any device (e.g., display 120) that enables a user to interact with computer system 104 or any device that enables computer system 104 to communicate with one or more other computer systems.

Computer system 104 can comprise any general purpose computing article of manufacture capable of executing computer program code installed by a user (e.g., a personal computer, server, handheld device, etc.). However, it is understood that computer system 104 is only representative of various possible computer systems that may perform the various processes of the invention. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures that can be used to implement the present invention. For example, in an embodiment, computer infrastructure 102 comprises two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 7 can be implemented independently, combined, and/or stored in memory for one or more separate computer systems that communicate over a network. Further, it is understood that some of the systems and/or functionality may not be implemented, or additional systems and/or functionality may be included as part of system 100.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 110 and/or storage system 118 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a computer infrastructure, such as computer infrastructure 102, that performs the processes of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as computer infrastructure 102, can be obtained (e.g., created, maintained, having made available to, etc.) and one or more systems for performing the processes of the invention can be obtained (e.g., created, purchased, used, modified, etc.) and deployed to the computer infrastructure. To this extent, the deployment of each system can comprise one or more of the following: (1) installing program code on a computer system, such as computer system 104, from a computer-readable medium; (2) adding one or more computer systems to the computer infrastructure; and (3) incorporating and/or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

Computer system 104 is configured to implement any/all embodiments of the present invention, as detailed above. For example, referring to FIG. 8, in step S1, computer system 104 is configured to represent a plurality of complex systems using a respective set of buildings in a virtual city environment. In S2, each of a plurality of floors in each of the set of buildings is interconnected. In S3, a plurality of furniture items within a room of each of the set of buildings is provided. In S4, a weather characteristic surrounding each of the set of buildings and a characteristic within the room based on a satisfaction level for the components of each of the plurality of complex systems is adjusted. In S5, a plurality of furniture items within a room of each of the set of buildings is provided. In S6, each of the set of buildings is interconnected. In S7, the set of buildings in the virtual environment is displayed.

Figure 8:
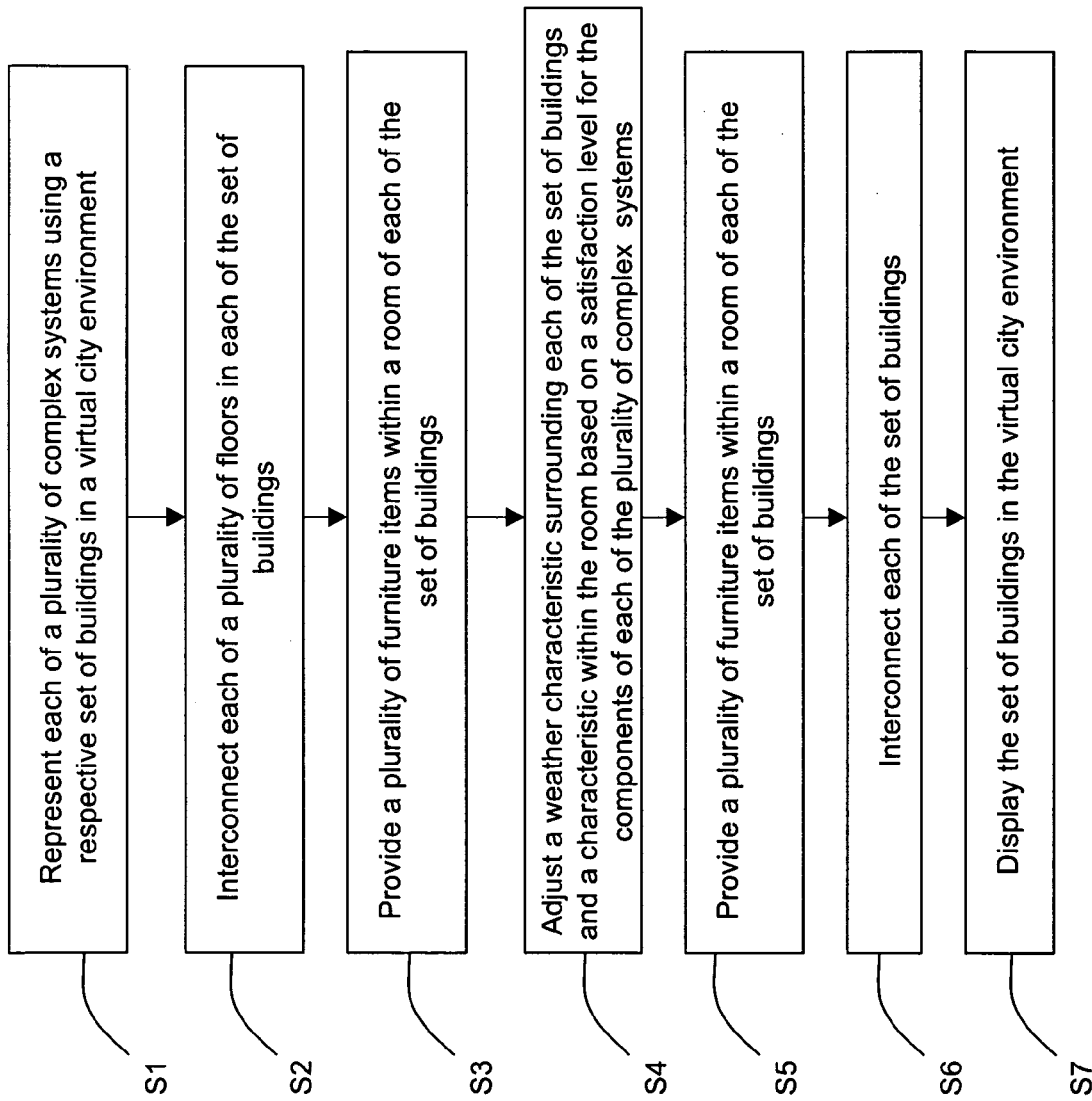
FIG. 8 depicts a flow diagram of a method for generating a visualization of a software offering using a set of buildings according to the present invention.

The flowchart of FIG. 8 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

The foregoing description of the preferred embodiments of this invention has been presented for purposes of illustration and description. It is not intended to be exhaustive or to limit the invention to the precise form disclosed, and obviously, many modifications and variations are possible. For example, although the complex system has been described in the context of a software offering, another embodiment could map a real-world factory into a set of buildings in a virtual city environment. For example, each product could be a set or subset of buildings, wherein each building represents a specific assembly line. The floors within each building may show how the assembly line has changed over time. Further, the connections between floors within the buildings show which versions of the other assembly lines were active during that phase of the assembly line. Such modifications and variations that may be apparent to a person skilled in the art are intended to be included within the scope of the invention as defined by the accompanying claims.

What is claimed is:

1. A method for generating a visualization of software code using a set of buildings, comprising:
representing software code using a set of buildings in a virtual city environment, wherein each building of the set of buildings represent a software solution;
displaying the set of buildings in the virtual city environment;
generating a plurality of interconnections between at least two buildings of the set of buildings, wherein each of the plurality of interconnections represents an interaction between the software solutions represented by the at least two buildings, wherein each of the plurality of interconnections is represented as a route traversable by an avatar within the virtual city environment, and wherein a type of the route traversable by the avatar varies based on the interaction between the software solutions represented by the at least two buildings;
displaying, in the virtual city environment, weather characteristics representing customer satisfaction, wherein one or more of the weather characteristics surrounding a building of the set of buildings is displayed according to a level of customer satisfaction for the software solution represented by the building; and
displaying a plurality of floors and a plurality of rooms within each of the plurality of floors of the set of buildings, wherein each of the plurality of floors of a building of the set of buildings represents a software component of the software solution represented by the building, and wherein each of the plurality of rooms within each floor of the building represents a different version of the software component represented by the floor of the building.

2. The method of claim 1, further comprising displaying an interconnection between at least two of the plurality of floors, wherein each interconnection represents a communication between the software components represented by the at least two of the plurality of floors.

3. The method of claim 1, further comprising displaying a plurality of furniture items within a room of each of the set of buildings, wherein each of the plurality of furniture items represents a stage of the software code.

4. The method of claim 3, wherein the room has one or more characteristics, the method further comprising adjusting a characteristic within the room based on a satisfaction level for the version of the software component represented by the room.

5. The method of claim 1, wherein a higher number of interconnections between two buildings is generated to reflect a higher level of interconnectivity between the software solutions represented by the two buildings.

6. The method according to claim 1, further comprising compiling data from a plurality of sources into a software offering programming code base, the plurality of sources including any of the following: problem reporting sources, design databases, test case repositories, original anecdote repositories from developers, architects, testers and people who have worked on the software components through time, wherein the compiled data is provided from the offering programming code base to generate the visualization of software code using the set of buildings in the virtual city environment.

7. The method according to claim 1, further comprising:
determining whether each of the software solutions is self-contained; and
further representing one or more of the software solutions with a set of windows generated within one or more rooms of the set of buildings in the case that the one or more of the software solutions is not self-contained, and representing the one or more of the software solutions as having no windows in the case that the one or more of software solutions is self-contained.

8. The method according to claim 1, further comprising:
receiving a search input from a user at a web site that is a front end for searching information in the virtual city environment, the search input indicating a desire to locate a software solution corresponding to the software code; and
presenting the user with a set of teleporting options for traveling to one or more of the set of buildings within the virtual city environment representing the software solution.

9. A computer system for generating a visualization of software code using a set of buildings comprising:
at least one processing unit;
memory associated with the at least one processing unit; and
a visualization tool storable in memory and executable by the at least one processing unit, the visualization tool comprising:
an offering component configured to:
represent software code using a set of buildings in a virtual city environment, wherein each building of the set of buildings represent a software solution; and
generate a plurality of interconnections between at least two buildings of the set of buildings, wherein each of the plurality of interconnections represents an interaction between the software solutions of the at least two buildings, wherein each of the plurality of interconnections is represented as a route traversable by an avatar within the virtual city environment, and wherein a type of route traversable by the avatar varies based on the interaction between the software solutions represented by the at least two buildings; and
a display component configured to:
display the set of buildings and the plurality of interconnections in the virtual city environment;
display a plurality of floors and a plurality of rooms within each of the plurality of floors of the set of buildings, wherein each of the plurality of floors of a building of the set of buildings represents a software component of the software solution represented by the building, and wherein each of the plurality of rooms within each floor of the building represents a different version of the software component represented by the floor of the building; and
display, in the virtual city environment, weather characteristics representing customer satisfaction, wherein one or more of the weather characteristics surrounding a building of the set of buildings is displayed according to a level of customer satisfaction for the software solution represented by the building.

10. The system of claim 9 further comprising a linking component configured to interconnect at least two of the plurality of floors, wherein each interconnection represents a communication between the software components represented by the at least two of the plurality of floors.

11. The system of claim 9 further comprising a staging component configured to provide a plurality of furniture items within a room of each of the set of buildings, wherein each of the plurality of furniture items represents a stage of the software code.

12. The system of claim 11 further comprising a satisfaction component configured to adjust a characteristic within the room based on a satisfaction level for the version of the software component represented by the room.

13. A non-transitory computer-readable storage medium storing computer instructions, which when executed, generates a visualization of software code using a set of buildings, the computer instructions comprising:

representing software code using a set of buildings in a virtual city environment, wherein each building of the set of buildings represent a software solution;

displaying the set of buildings in the virtual city environment;

generating a plurality of interconnections between at least two buildings of the set of buildings, wherein each of the plurality of interconnections represents an interaction between the software solutions represented by the at least two buildings, wherein each of the plurality of interconnections is represented as a route traversable by an avatar within the virtual city environment, and wherein a type of the route traversable by the avatar varies based on the interaction between the software solutions represented by the at least two buildings;

displaying, in the virtual city environment, weather characteristics representing customer satisfaction, wherein one or more of the weather characteristics surrounding a building of the set of buildings is displayed according to a level of customer satisfaction for the software solution represented by the building; and displaying a plurality of floors and a plurality of rooms within each of the plurality of floors of the set of buildings, wherein each of the plurality of floors represents a software component of the software solution represented by the building, and wherein each of the plurality of rooms within each floor of the building represents a different version of the software component represented by the floor of the building.

14. The non-transitory computer readable storage medium according to claim 13, further comprising instructions for displaying an interconnection between at least two of the plurality of floors, wherein each interconnection represents a communication between the software components represented by the at least two of the plurality of floors.

15. The non-transitory computer readable storage medium according to claim 13, further comprising instructions for displaying a plurality of furniture items within a room of each of the set of buildings, wherein each of the plurality of furniture items represents a stage of the software code.

16. The non-transitory computer readable storage medium according to claim 15, wherein the room has one or more characteristics, the computer readable storage medium further comprising instructions for adjusting a characteristic within the room based on a satisfaction level for the version of the software component represented by the room.

17. The non-transitory computer readable storage medium according to claim 13, wherein a higher number of interconnections between two buildings is generated to reflect a higher level of interconnectivity between the software solutions represented by the two buildings.

18. A method for deploying an application for generating a visualization of software code using a set of buildings, comprising:

providing a computer infrastructure configured to:

represent software code using a set of buildings in a virtual city environment, wherein each building of the set of buildings represent a software solution;

displaying the set of buildings in the virtual city environment;

generating a plurality of interconnections between at least two buildings of the set of buildings, wherein each of the plurality of interconnections represents an interaction between the software solutions represented by the at least two buildings, wherein each of the plurality of interconnections is represented as a route traversable by an avatar within the virtual city environment, and wherein a type of the route traversable by the avatar varies based on the interaction between the software solutions represented by the at least two buildings;

displaying, in the virtual city environment, weather characteristics representing customer satisfaction, wherein one or more of the weather characteristics surrounding a building of the set of buildings is displayed according to a level of customer satisfaction for the software solution represented by the building; and displaying a plurality of floors and a plurality of rooms within each of the plurality of floors of the set of buildings, wherein each of the plurality of floors of a building of the set of buildings represents a software component of the software solution represented by the building, and wherein each of the plurality of rooms within each floor of the building represents a different version of the software component represented by the floor of the building.

* * * * *